United States Patent Office 2,698,774
Patented Jan. 4, 1955

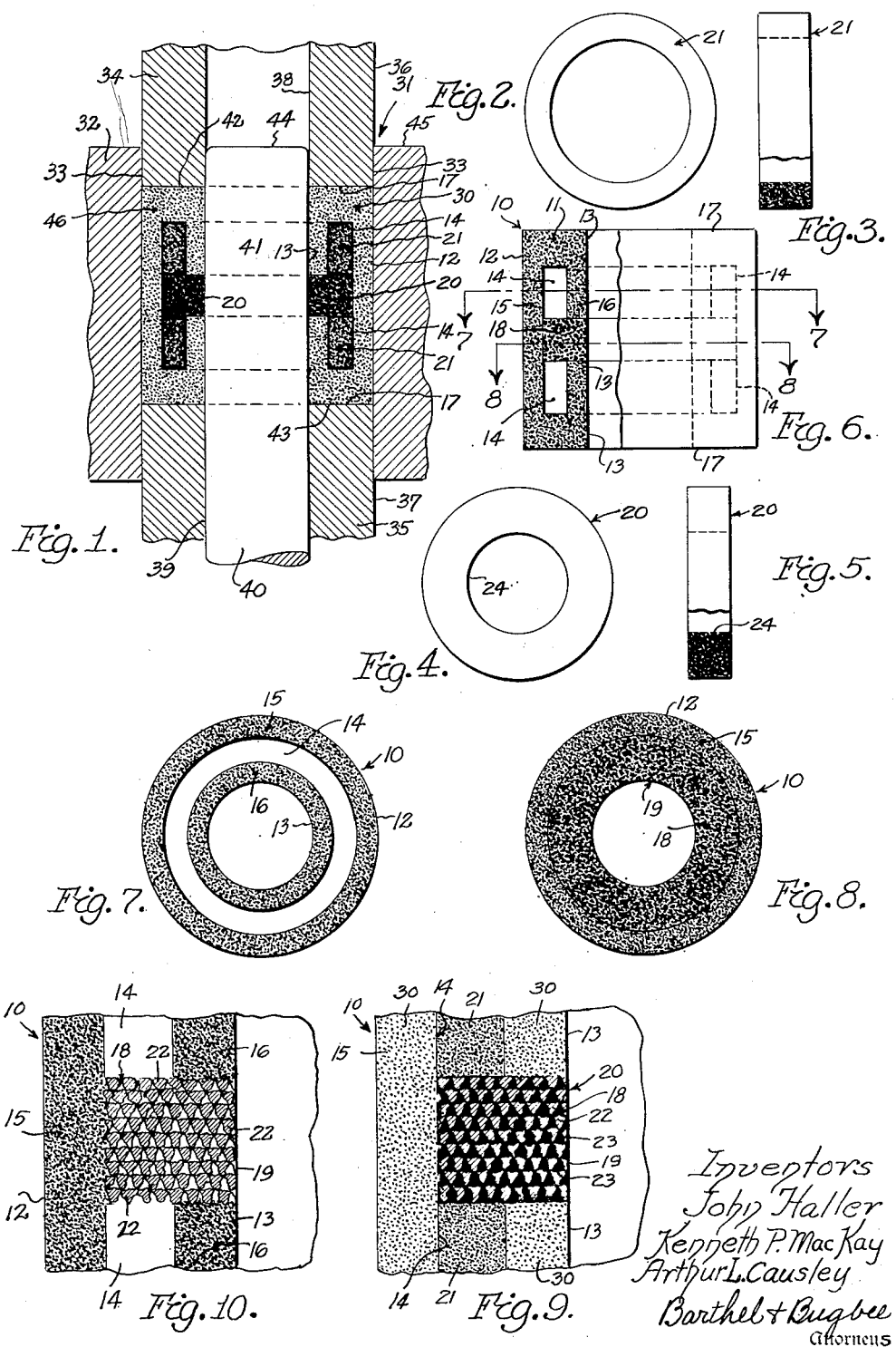

2,698,774

OIL-REGULATING POWDERED METAL BEARING

John Haller, Northville, Kenneth P. MacKay, Ann Arbor, and Arthur L. Causley, Detroit, Mich., assignors to Michigan Powdered Metal Products Co., Inc., Northville, Mich., a corporation of Michigan Application June 21, 1952, Serial No. 294,822

5 Claims. (Cl. 308—240)

This invention relates to sintered powdered metal bearings and, in particular, to such bearings having lubricant reservoirs therein.

One object of this invention is to provide a sintered powdered metal bearing having a lubricant reservoir which is separated from the bearing surface by a porous cellular structure so constructed and proportioned as to regulate the flow of lubricant and thereby control the proper feeding thereof to the bearing surface.

Another object is to provide a sintered powdered metal bearing of the foregoing character wherein the lubricant reservoir may be made of larger capacity than is ordinarily possible with the use of an infiltratable core for producing the reservoir, because the increase in density and consequent reduction in porosity which would otherwise impede the flow of oil is inconsequential because the flow of oil to the bearing takes place primarily through the porous cellular structure rather than through the pores of the bearing body itself.

Another object is to provide a sintered powdered metal bearing of the character set forth in the object immediately preceding, the density of the bearing body being capable of increase to almost complete elimination of pores, thereby avoiding oil leakage or sweating effects to the outside of the bearing since the feeding of the oil then depends solely on the wick effect of the porous cellular structure interposed between the oil well or lubricant reservoir and the bearing surface to be lubricated.

Other objects and advantages of the invention will become apparent during the course of the following description of the accompanying drawings, wherein:

Figure 1 is a central vertical section through the die cavity of a conventional powdered metal molding press showing the position of the parts during the molding operation involved in the production of a bearing of the present invention;

Figure 2 is a front elevation of an infiltratable metallic core for producing the lubricant reservoir of the bearing of the present invention;

Figure 3 is a side elevation partly in central vertical section of the core shown in Figure 2;

Figure 4 is a front elevation of a partially infiltratable metallic cellular core for producing the porous cellular structure of the bearing of the present invention;

Figure 5 is a side elevation, partly in central vertical section of the core shown in Figure 4;

Figure 6 is a side elevation, partly in central vertical section, of a completed sintered powdered metal oil well bearing according to one form of the invention, as produced by the operation shown in Figure 1;

Figure 7 is a horizontal section through one of the lubricant reservoirs or oil wells, taken along the line 7—7 in Figure 6;

Figure 8 is a horizontal section through the porous cellular structure, taken along the line 8—8 in Figure 6;

Figure 9 is an enlarged fragmentary diagrammatic view of the unsintered bearing containing the cellular core and adjacent infiltratable cores; and Figure 10 is a view similar to Figure 9, but showing the construction diagrammatically after sintering and infiltration have been accomplished.

Sintered powdered metal bearings containing lubricant reservoirs such as are disclosed and claimed in the Haller Patent No. 2,625,452 of January 13, 1953, for "Porous Bearing with Lubricant Reservoir Therein," have hitherto been limited as to the size of the reservoirs and feeding rate of the lubricant because of the partial or complete closing up of the pores in the powdered metal body by the infiltration of the lower melting metal of the oil well core. The larger the core used to produce the lubricant reservoir for a given size of bearing body, the denser is the porosity of the body after sintering. Accordingly, the use of a relatively large core to produce a correspondingly large lubricant reservoir has hitherto required the use of a hollow core in order to avoid the excessive densification of the bearing body resulting from the infiltration of the large quantity of core metal which would occur with a solid core of the desired size. This excessive densification, while increasing the hardness and structural strength of the bearing, naturally resulted in a sluggish flow of oil to the bearing surface, and the flow was not easily regulated. Furthermore, the subsequent sizing of the bearing bore by passing through it a sizing plunger of the desired diameter had the effect of still further closing up the pores of the metal adjacent the bearing surface.

The present invention provides a sintered powdered metal bearing with a lubricant reservoir separated from the bearing surface by a porous cellular structure, the porosity of which can be predetermined accurately so that the rate of feed of the oil to the bearing surface can be regulated to a desired amount, regardless of the size of the lubricant reservoir or density of the bearing body since the porosity of the bearing body is not relied upon primarily for the feeding of the oil to the bearing surface. The present invention also enables the provision of a lubricant reservoir created by the use of a large infiltratable core which results in almost 100% density of the bearing body if desired, since the oil feeds through the cellular structure rather than through the pores of the bearing body. Furthermore, the sizing of the bearing bore by the use of a sizing press, which tends to close up the pores in the vicinity of the bearing bore, has no serious effect in the bearing of the present invention where these pores are not relied upon primarily for the feeding of the oil to the bearing surface.

Referring to the drawing in detail, Figures 6 to 8 inclusive show a sintered powdered metal oil well bearing, generally designated 10, according to one form of the invention as consisting of a hollow cylindrical bearing body 11 of sintered powdered metal having outer and inner cylindrical surfaces 12 and 13, the latter usually constituting the bearing surface. Disposed within the interior of the bearing body 11 is one or more lubricant reservoirs or oil wells 14 (two being shown) preferably of annular shape surrounding the bearing bore 13 and preferably coaxial therewith. The lubricant reservoirs 14 are separated from the outer and inner surfaces 12 and 13 by approximately annular or cylindrical outer and inner wall portions 15 and 16 respectively. The lubricant reservoirs or oil wells 14 are also spaced away from the opposite ends 17 of the bearing 10 and spaced axially apart from one another, the space between them being occupied by a porous cellular or honeycomb structure 18 of annular form extending inward to the bearing surface or bore 13 and ordinarily possessing larger pores than the pores of the bearing body 11. The cellular structure 18 is likewise of sintered powdered metal and in appearance resembles a honeycomb or sponge. It serves as a lubricant flow regulator and lubricant conductor for conveying the oil from the reservoirs 14 to the bore 19 of the cellular structure 18 which is co-extensive with and is substantially a continuation of the bearing bore 13. The lubricant reservoirs 14, on the other hand, are preferably voids in order to hold the maximum amount of oil or other lubricant.

In the process of making the oil well bearing 10 shown in Figures 6 to 8 inclusive, a core 20 of composite construction (Figures 4 and 5) is prepared for producing the cellular structure 18, and a pair of cores 21 (Figures 2 and 3) are prepared of solid or completely infiltratable metal or metal alloy for producing the lubricant reservoirs 14. If, however, only one lubricant reservoir 14 is to be provided, only one core 21 is required. The core 20 is prepared by mixing together non-infiltratable powdered metal of a larger size of particle than the particle size in the bearing body 11 and preferably of the same metal. If, for example, the bearing body 11 is to be made of powdered iron, the core 20 may be composed of coarser particles of powdered iron mixed with particles of copper or copper-zince alloy in any suitable ratio, such as approximately 85% copper and 15% zinc. The infiltratable metal is selected to be of such nature as to melt at the sintering temperature and below the melting point of the powdered metal of the bearing body.

Figure 9 shows diagrammatically the approximate appearance of the core 20 in cross-section, as consisting of non-infiltratable coarse particles 22 held together by the infiltratable metal or metal alloy 23 either in the form of particles or of solid metal. The core 20 is made in the form of a ring having an internal bore 24 of substantially the same diameter as the bore 13 desired for the finished bearing, making due allowance for change in size during the sintering operation, the final diameter being that of the bore 19 (Figure 6). The core 20 may thus be made either by casting, in the event that a solid infiltratable metal is used, or by molding, in case it is desired to use powdered infiltratable metal. The term "infiltratable metal" means metal or a metal alloy which melts and flows into the pores of the bearing body 11 during the sintering operation, whereas the term "non-infiltratable metal" refers to a metal or metal particles which do not melt at the sintering temperature and do not therefore essentially change their condition during the sintering operation.

The core or cores 21 for the production of the oil wells or lubricant reservoirs 14 are formed from infiltratable metal and of the size desired for the lubricant reservoirs 14. As previously stated, if the bearing body 11 is to be composed of powdered iron, the core or cores 21 may be composed of copper-zinc alloy in the ratio of 85% copper and 15% zinc. This may also be made up by casting the cores 21 in solid form or by molding them from powdered metal or powdered metal alloy of the desired composition.

To prepare the semi-finished or unsintered assembly, generally designated 30 (Figure 1), use is made of a conventional molding press, generally designated 31. The molding press 31 is of any suitable construction, the main components being shown diagrammatically as including the usual die or mold 32 having a bore or die cavity 33 in which upper and lower hollow tubular plungers 34 and 35 reciprocate, the plungers 34 and 35 having outer surfaces 36 and 37 of cylindrical form and of substantially the same diameter as the die cavity or bore 33 with the necessary clearance therebetween. The plungers 34 and 35 have bores 38 and 39 adapted to receive a central solid plunger or core rod 40, the outer surface 41 of which is of suitable diameter to permit sliding motion between these components. The plungers 34 and 35 have annular pressing surfaces 42 and 43 respectively and the core rod 40 has an upper end 44 which, in the normal use of the press is placed substantially on the same level as the top surface 45 of the mold or die 32.

In performing the molding operation, the upper tubular plunger 34 is raised out of the way and the lower tubular plunger 35 moved upward in the bore 33 the desired distance, according to the size of the workpiece to be produced and the amount of compression to be imparted to it. To start with, a layer of powdered bearing metal, such as powdered iron, is placed in the bottom of the die cavity 33 above the upper end 43 of the lower tubular plunger 35. This layer is of such thickness that when it is compressed, it is of the desired thickness by which it is intended to separate the oil well or lubricant reservoir 14 from the end 17 of the bearing body 11. One of the oil well cores 21 is then placed upon the top of this layer of powdered bearing metal in the position shown in Figure 1, and the space around it filled with powdered bearing metal. The composite core 20 is then lowered into the mold cavity 33 with its surface 24 encircling the core rod 40, after which the second oil well core 21 is placed on top of the composite core 20. The filling of the mold cavity 33 is then completed up to approximately the level of the top surface 45 of the mold or die 32, thereby surrounding the cores 20 and 21 with a full charge 46 of the bearing metal, such as powdered iron.

The operator now operates the press 31 to move the upper tubular plunger 34 downward into the mold or die cavity 33, compressing the charge 46 of powdered metal between the plunger surfaces 42 and 43. When the desired compression of the charge 46 has been accomplished and the desired density obtained, according to procedures well known to persons skilled in the art of powder metallurgy, the upper tubular plunger 34 is retracted upward, while the lower tubular plunger 35 is raised until its top surface 43 reaches the level of the top surface 45 of the mold or die 32, ejecting the semi-finished bearing or workpiece 30. For small bearings, a molding pressure of 25 to 30 tons has been found sufficient, but the necessary pressure of course depends upon the size of the workpiece and the density desired.

The semi-finished or unsintered workpiece 30 is then sintered in a conventional sintering oven for a period of time and at a temperature suitable to the particular size of workpiece and metals being employed. Where the semi-finished bearing 30 is composed of powdered iron, for example, and the infiltratable metal of the cores 20 and 21 is of the previously-mentioned copper-zinc alloy, sintering for approximately one-half hour at a temperature of 2020° F. has been found satisfactory for small bearings. The sintering temperature must, of course, be above the melting point of the infiltratable core metal but below the melting point of the powdered metal of the bearing body. The raising of the temperature during the sintering operation causes the metal or metal alloy of the cores 20 and 21 to melt and infiltrate the pores of the powdered metal charge 46.

The melting and infiltration of the cores 21 in this manner causes them to disappear completely, leaving the voids 14 (Figure 6), whereas the melting of the infiltratable metal portion 23 of the composite core 20 (Figure 9) causes the portions 23 to disappear into the surrounding charge 46 of powdered iron, leaving the porous honeycomb structure 18 (Figure 10) composed of the coarse powdered iron particles 22 which have not been sintered. The cellular or honeycomb structure 18 thus has the appearance of a sponge and is readily permeable by oil or other lubricant.

The infiltration of the core metal or metal alloy into the powdered metal charge 46 not only creates the voids or cellular structure mentioned above, but also densifies the sintered powdered metal bearing body 11 which results therefrom. Since the oil or other lubricant is fed from the oil wells or lubricant reservoirs 14 through the cellular structure 18 to the bearing bores 19 and 13, it is unnecessary to confine the volume of the oil wells 14 to a predetermined maximum amount because the density of the bearing body 11 does not require limitation in order to permit the flow of oil, since the pores of the bearing body 11 are not relied on primarily for such flow. As previously stated, therefore, the lubricant reservoirs 14 may be made as large as possible, limited only by the necessity of leaving no residue of the core metal behind in the voids 14 or in the cellular structure 18, since the oil flows out through the latter.

Following the sintering operation, the lubricant reservoirs 14 of the sintered bearing and the pores of the honeycomb structure 18 are filled with oil or other lubricant in any one of several possible ways. Under one procedure, the bearing is placed in a bath of heated lubricating oil of the type and viscosity desired in the final bearing, immersing it for 20 minutes to a half hour in oil at a temperature of 180° F., causing the air to bubble out through the pores and become replaced with the hot oil. The filling may optionally be carried out in a vacuum tank, the evacuation of which accelerates the withdrawal of the air, and the readmission of air causing the oil to flow through the pores of the bearing body into the lubricant reservoirs 14, aided by capillary attraction and osmosis. The filling of the bearing with lubricant may be accelerated by quickly removing the bearing from the hot oil bath as soon as the air bubbles have ceased to appear, and plunging the bearing into a bath of cool lubricant at room temperature or below. Finally, lubricant may be forced into the lubricant reservoirs by the use of a power-driven plunger or a hole may be drilled through the bearing wall into the lubricant reservoir, the lubricant forced in through this hole, pushing out the air ahead of it, and the hole then closed by a plug. The quantity of oil or other lubricant which has been placed in the bearing is easily determined by subtracting the weight of the bearing before the first immersion in the lubricant bath from its weight after immersion.

While the foregoing example has been given in terms of a powdered iron bearing, bearings of other powdered metals may be made according to the invention. If, for example, the bearing 10 is to be made of powdered bronze, say of 90% copper and 10% tin, the cores 21 may be made of metallic lead, with the optional addition of a small quantity of antimony to raise the melting point of the lead and increase its compression strength. The composite core 20 in that case would be composed of coarser particles of bronze in metallic lead, with or without the above-mentioned addition of antimony. The procedure and result are similar to that described above in connection with powdered iron and copper-zinc alloy.

In the use of the invention, the shaft or other moving machine element moving within the bearing bore 13 is lubricated by oil which seeps out through the porous cellular or honeycomb structure 18 through the bore 19 thereof, causing a firm of lubricant to be deposited within the bore 13. The size of the particles 22 in the cellular structure 18 is chosen according to the rate of feed desired, coarser particles for a rapid feed and finer particles for a slower feed.

What we claim is:

1. An oil well bearing comprising a bearing body of sintered powdered metal having a bearing surface and a lubricant chamber in a wall thereof, said bearing body having a passageway extending from said chamber to said bearing surface, and a porous lubricant flow-regulating structure of sintered powdered metal of coarser porosity than said bearing body disposed in said passageway and having minute lubricant channels therethrough said flow-regulating structure extending entirely across said chamber and being fused integrally to the opposite wall portions thereof, whereby to meter the lubricant flow to said bearing surface and also to mechanically strengthen said bearing body wall by bridging said lubricant chamber intermediate the ends thereof by said flow-regulating structure.

2. An oil well bearing comprising a bearing body of sintered powdered metal having a bearing surface and a lubricant chamber in a wall thereof, said bearing body having a passageway extending from said chamber to said bearing surface, and a porous lubricant flow-regulating structure of sintered powdered metal fused integrally to said bearing body composed of particles of larger size than the particles composing said bearing body disposed in said passageway and having minute lubricant channels therethrough.

3. An oil well bearing comprising a bearing body of sintered powdered metal having a bearing surface and a lubricant chamber in a wall thereof, said bearing body having a passageway extending from said chamber to said bearing surface, and a porous lubricant flow-regulating structure of sintered powdered metal fused integrally to said bearing body composed of particles of substantially the same metal as said bearing body but of larger size than the particles composing said bearing body disposed in said passageway and having minute lubricant channels therethrough.

4. An oil well bearing comprising a bearing body of sintered powdered metal having a bearing surface and a pair of spaced lubricant chambers in a wall thereof, said bearing body having a passageway extending from said chambers to said bearing surface, and a porous lubricant flow-regulating structure of sintered powdered metal fused integrally to said bearing body composed of particles of larger size than the particles composing said bearing body disposed in said passageway and having minute lubricant channels therethrough.

5. An oil well bearing comprising a bearing body of sintered powdered metal having a bearing surface and a pair of spaced lubricant chambers in a wall thereof, said bearing body having a passageway extending from said chambers to said bearing surface, and a porous lubricant flow-regulating structure of sintered powdered metal fused integrally to said bearing body composed of particles of substantially the same metal as said bearing body but of larger size than the particles composing said bearing body disposed in said passageway and having minute lubricant channels therethrough.

References Cited in the file of this patent

UNITED STATES PATENTS

| | | |
|---|---|---|
| 1,936,894 | Whiteley | Nov. 28, 1933 |
| 2,227,307 | Hildabolt | Dec. 31, 1940 |
| 2,625,452 | Haller | Jan. 13, 1953 |